US008728600B1

(12) United States Patent
Hayes

(10) Patent No.: US 8,728,600 B1
(45) Date of Patent: May 20, 2014

(54) HIGHLY ABRASION-RESISTANT GRAFTED POLYOLEFIN PIPE

(75) Inventor: Richard Allen Hayes, Beaumont, TX (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/534,593

(22) Filed: Jun. 27, 2012

Related U.S. Application Data

(63) Continuation-in-part of application No. 12/263,161, filed on Oct. 31, 2008, now abandoned.

(51) Int. Cl.
*B32B 1/08* (2006.01)
*B32B 5/02* (2006.01)
*F16L 9/00* (2006.01)
*F16L 9/14* (2006.01)
*B29C 65/00* (2006.01)
*F17D 1/00* (2006.01)

(52) U.S. Cl.
USPC ..... 428/36.91; 428/35.8; 428/36.1; 428/36.2; 428/36.4; 428/36.8; 138/141; 138/143; 138/153; 138/174; 442/2; 442/43; 442/50; 442/58; 156/294; 137/1

(58) Field of Classification Search
USPC ........... 428/34.1, 35.7, 35.8, 35.9, 36.1, 36.2, 428/36.4, 36.8, 36.9, 36.91; 138/140, 141, 138/143, 145, 146, 153, 172, 174, 177; 442/1, 2, 20, 23, 43, 44–46, 49, 50, 54, 442/58, 181, 304, 327; 156/294; 137/1
See application file for complete search history.

(56) References Cited

U.S. PATENT DOCUMENTS

| | | |
|---|---|---|
| 3,236,917 A | 2/1966 | Natta |
| 3,616,019 A | 10/1971 | Mueller-Tamm |
| 3,619,320 A | 11/1971 | Mueller-Tamm |
| 3,634,166 A | 1/1972 | Frielingsdorf |
| 3,932,368 A | 1/1976 | McConnell |
| 4,048,355 A | 9/1977 | Sakayori |
| 4,049,904 A | 9/1977 | Hori |
| 4,092,452 A | 5/1978 | Hori |
| 4,232,086 A | 11/1980 | Mori |
| 4,237,037 A | 12/1980 | Takahashi |
| 4,254,165 A | 3/1981 | Phelps |
| 4,345,004 A | 8/1982 | Miyata |
| 4,400,428 A * | 8/1983 | Rosenthal et al. ............ 428/349 |
| 4,481,239 A | 11/1984 | Eckner |
| 4,612,155 A | 9/1986 | Wong |
| 4,732,632 A | 3/1988 | Pieslak |
| 4,737,547 A | 4/1988 | White |
| 4,824,736 A | 4/1989 | Ehrig |
| 4,888,394 A | 12/1989 | Boudreaux |
| 4,950,541 A | 8/1990 | Tabor |
| 5,091,260 A | 2/1992 | Wong |
| 5,178,902 A | 1/1993 | Wong |
| 5,180,458 A | 1/1993 | White |
| 5,194,509 A | 3/1993 | Hasenbein |
| 5,211,990 A | 5/1993 | McKinney |
| 5,275,848 A | 1/1994 | Mito |
| 5,279,864 A | 1/1994 | Ohkita |
| 5,346,963 A | 9/1994 | Hughes et al. |
| 5,523,358 A | 6/1996 | Hirose |
| 5,677,377 A | 10/1997 | Hasegawa |
| 5,677,378 A | 10/1997 | Hasegawa |
| 5,705,565 A | 1/1998 | Hughes |
| 5,744,250 A | 4/1998 | Lee |
| 5,921,285 A * | 7/1999 | Quigley et al. ............... 138/125 |
| 5,955,547 A | 9/1999 | Roberts |
| 5,976,652 A | 11/1999 | Krause |
| 6,224,710 B1 | 5/2001 | Rinde |
| 6,294,597 B1 | 9/2001 | Rinde |
| 6,399,191 B1 | 6/2002 | Wong |
| 6,545,091 B1 | 4/2003 | Lee |
| 6,976,510 B2 | 12/2005 | Campagna |
| 7,408,007 B2 | 8/2008 | Roberts |
| 8,080,298 B2 * | 12/2011 | Oishi et al. ................... 428/36.8 |
| 8,153,215 B1 * | 4/2012 | Peduto et al. ................ 428/35.7 |
| 2005/0217747 A1 | 10/2005 | Buriak |
| 2005/0257848 A1 | 11/2005 | Funatsu |
| 2005/0287322 A1 * | 12/2005 | Grund et al. ................. 428/34.8 |
| 2006/0025527 A1 | 2/2006 | Chou |
| 2006/0108016 A1 | 5/2006 | Funatsu |
| 2008/0078445 A1 | 4/2008 | Patel |
| 2008/0115825 A1 | 5/2008 | Patel |

FOREIGN PATENT DOCUMENTS

| | | | |
|---|---|---|---|
| EP | 0366168 A1 | 5/1990 | |
| EP | 0479457 A1 | 4/1992 | |
| EP | 0266994 | 10/2008 | |
| WO | 94/12581 | 4/1994 | |
| WO | WO 99/01280 | * 1/1999 | ............. B32B 27/34 |
| WO | 2009/059108 A1 | 5/2009 | |

* cited by examiner

*Primary Examiner* — Walter B Aughenbauch

(57) ABSTRACT

A pipe- or tube-shaped article comprising an innermost layer made from a grafted polyolefin composition is disclosed which can provide long lifetime, highly abrasion-resistant pipes for mining and other transportation uses. Methods for preparing the article and transporting abrasive materials through the article are also described.

19 Claims, No Drawings

HIGHLY ABRASION-RESISTANT GRAFTED POLYOLEFIN PIPE

This application is a continuation-in-part of application Ser. No. 12/263,161, filed Oct. 31, 2008, now abandoned; the entire disclosure of which is incorporated herein by reference.

The invention relates to highly abrasion-resistant tubular articles comprising grafted polyolefin layers that provide for the transport of particulates and slurries, methods and compositions to produce the articles, and methods of transporting abrasive materials through them.

BACKGROUND OF THE INVENTION

Mining operations require the transport of highly abrasive particulate or slurry streams. The recovery of bitumen from oil sands is becoming increasingly important within the energy industry. Processing oil sand includes transporting and conditioning the oil sand as an aqueous slurry over kilometer lengths of pipe up to 1 meter in diameter. Processes for recovery of bitumen from oil sands are known (U.S. Pat. Nos. 4,255,433, 4,414,117, 4,512,956, 4,533,459, 5,039,227, 6,007,708, 6,096,192, 6,110,359, 6,277,269, 6,391,190, US2006/0016760, US2006/0249431, US2007/0023323, US2007/0025896, WO2006/060917, CA1251146, CA2195604, CA2227667, CA2420034, CA2445645, and CA2520943). Use of caustic to assist in the recovery process of oil from oil sands is also known (US2006/0016760 and US2006/0249431). Other mining operations that include the transport of highly abrasive particulate or slurry streams from the mine to processing refinery include, for example, iron ore, coal and coal dust, and the like, and in further non-mining transport processes, such as grain, sugar and the like.

Often, metal pipes, such as carbon steel or cast iron pipes, are used for the transport of these highly abrasive streams. They are expensive, heavy and only provide a temporary solution since they are eventually destroyed. To increase their lifetimes, the metal pipes may be rotated 90 degrees on their axes on a regular basis to provide a new transport surface. However, because of the pipe weight, this rotation is difficult and ultimately the entire pipe is worn out and must be replaced.

Use of plastic pipes, pipe liners and pipe coatings has been proposed to reduce these shortcomings. Material selection is critical. Many of the commonly available materials cannot stand up to such highly-abrasive mining streams and are quickly worn out. For example, high density poly(ethylene) pipes are generally used as liners for sanitary sewer and wastewater pipelines but they rapidly degrade under highly abrasive environments. U.S. Pat. No. 4,042,559 discloses abrasive granule-filled, partially-cured coatings for use in abrasion resistant coated pipes for the transport of mining slurries. U.S. Pat. No. 4,254,165 discloses processes to produce abrasion resistant pipes with 0.04-0.05-inch thick coatings of filled (such as sand) polyolefins, such as low and medium density poly(ethylene) and including poly(ethylene-co-acrylic acid). U.S. Pat. No. 4,339,506, WO90/10032, and CA1232553 disclose rubber liners for pipes. U.S. Pat. No. 4,215,178 discloses fluoropolymer-modified rubber pipe liners. US2006/0137757 and US2007/0141285 disclose fluoropolymer pipe liners. Polyurethane pipe coatings are known (U.S. Pat. No. 3,862,921, U.S. Pat. No. 4,025,670, US2005/0194718, US2008/0174110, GB2028461, JP02189379, JP03155937, and JP60197770). US2005/0189028 discloses metal pipe coated with a polyurethane liner to transport tar sand slurry. GB2028461 discloses an abrasion-resistant pipe lining comprising a urethane rubber thermoset embedded with the particles of the material to be transported (coal dust, grain or sugar) through transport of the materials during curing. Abrasion resistant pipes with elastomeric polyurea coatings are disclosed in U.S. Pat. No. 6,737,134. A shortcoming of the polyurethane coatings includes the highly complex processes for applying the coating to the metal pipe.

Use of grafted polyolefin compositions made from polyolefins grafted with an α-olefin monomer and α,β-ethylenically unsaturated carboxylic acid or anhydride as pipes, pipe liners and pipe coatings is known. For example, U.S. Pat. No. 4,481,239 discloses polyethylene powder coatings for pipes which may include an adhesive layer comprising certain acid copolymer powder coatings. U.S. Pat. Nos. 4,732,632, 5,178,902, 5,279,864, 6,224,710, 6,294,597, 6,976,510, US2005/0217747, US 005/0257848 and US2006/0108016 disclose corrosion and mechanical damage-resistant pipe coatings for pipe surfaces in which polyolefins with acrylate or maleic acid groups may be used as adhesives. U.S. Pat. No. 4,737,547 discloses films and pipes comprising blends which may include carboxylic acid- or maleic anhydride-grafted polyolefins.

U.S. Pat. No. 3,616,019, 3,619,320, 3,634,166 and 4,232,086 disclose the use of carboxyl-modified polyolefins as adhesives for polymeric metal coatings. U.S. Pat. Nos. 3,932,368, 4,237,037, 4,345,004 and 4,910,046 disclose polyolefin powder coatings for metal substrates which may include polar group modified olefinic resins, such as carboxyl- or anhydride-modified resins. U.S. Pat. Nos. 4,048,355, 4,049,904, 4,092,452 and 4,824,736 disclose a metal coating of a modified polyolefin grafted with a carboxylic acid or anhydride. U.S. Pat. No. 5,091,260 discloses a corrosion-resistant coating for metal substrates comprising 30-99 wt % metallic zinc and a carboxylic acid-grafted polyolefin. U.S. Pat. No. 5,211,990 disclose a flame spraying process of polyolefin powders onto metal substrates that include polyolefins grafted with acid or anhydride functionality and ethylene/(meth)acrylic acid copolymers and ionomers derived therefrom. U.S. Pat. No. 5,275,848 discloses a powder coating process for metal substrates with polyolefin powders that include polyolefins grafted with acid or anhydride functionality and ethylene/(meth)acrylic acid copolymers and ionomers derived therefrom. U.S. Pat. No. 5,677,377 and U.S. Pat. No. 5,677,378 disclose corrosion-resistant powder coatings for steel plate which include maleic anhydride-grafted polypropylene powder. U.S. Pat. No. 5,976,652 discloses corrosion-resistant polypropylene film coatings for steel containers adhered with carboxylic acid- or anhydride-functional polypropylenes.

A shortcoming of grafted polyolefin pipes, pipe liners and coatings in the art is low abrasion resistance resulting in short service lifetimes.

SUMMARY OF THE INVENTION

The invention is directed to a pipe- or tube-shaped article having an innermost layer wherein the innermost layer has a thickness of about 0.001 to about 102 mm and comprises a grafted polyolefin composition; and the innermost layer can have little or no weight loss measured with a wear test disclosed below.

the grafted polyolefin is produced from a parent polyolefin comprising ethylene and an α-olefin with 3 to 20 carbons having a density of about 0.92 g/cc (ASTM D-792) or less, grafted with about 0.005 to about 10 wt % of an α,β-ethylenically unsaturated carboxylic acid or anhydride; and has a Shore A hardness of about 96 or less (ASTM D2240, ISO 868).

The invention is also directed to a method for producing a grafted polyolefin-lined metal or plastic pipe comprising the step of pulling or inserting a pre-formed grafted polyolefin pipe or multilayer grafted polyolefin pipe into a preformed metal or plastic pipe wherein the article is characterized above.

The invention also provides a method to produce a grafted polyolefin-lined metal or plastic pipe comprising the step of laying up a pre-formed grafted polyolefin film or sheet or multilayer grafted polyolefin film or sheet into a preformed metal or plastic pipe wherein the article is characterized above.

The invention also provides a method for transporting an abrasive material comprising obtaining a pipe- or tube-shaped article as described above; preparing an abrasive material composition suitable for flowing through the article; flowing the abrasive material composition into one end of the pipe- or tube-formed article and receiving the abrasive material composition out of the other end of pipe- or tube-formed article.

DETAILED DESCRIPTION OF THE INVENTION

All publications, patent applications, patents, and other references mentioned herein are incorporated by reference in their entirety. Unless otherwise defined, all technical and scientific terms used herein have the same meaning as commonly understood by one of ordinary skill in the art to which this invention belongs.

Trademarks are in upper case.

The term "abrasive" or "abrasive article" has its plain meaning.

Although methods and materials similar or equivalent to those described herein can be used in the practice or testing of the present invention, suitable methods and materials are described herein.

Unless stated otherwise, all percentages, parts, ratios, etc., are by weight. When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

In describing certain polymers, sometimes applicants are referring to the polymers by the monomers used to make them or the amounts of the monomers used to make them. While such a description may not include the specific nomenclature used to describe the final polymer or may not contain product-by-process terminology, any such reference to monomers and amounts should be interpreted to mean that the polymer is made from those monomers or that amount of the monomers, and the corresponding polymers and compositions thereof.

The graft copolymer compositions and methods described herein may be used to provide long lifetime, highly abrasion-resistant pipes for a wide variety of mining and other transportation uses over a wide range of environmental conditions. High burst strength may be another attribute of the pipes.

Grafted Polyolefin Layer Composition

By thermoplastic grafted polyolefin polymer, grafted polyolefin and similar terms, reference is made to a thermoplastic grafted polyolefin made from a parent polyolefin made from ethylene and an $\alpha$-olefin having 3 to 20 carbons having a density of about 0.92 g/cc (ASTM D792) or less, grafted with about 0.005 to about 10 wt % of an $\alpha,\beta$-ethylenically unsaturated carboxylic acid or anhydride; and having a Shore A hardness of about 96 or less (ASTM D2240, ISO 868). The grafted polyolefin is made by grafting the $\alpha,\beta$-ethylenically unsaturated carboxylic acid or anhydride onto the parent polyolefin.

Regardless of the density a parent polyolefin is, only the innermost layer having little or no weight loss can be useful in the transportation of abrasive particulate or slurry stream to prolong the life of a pipe. The term "little or no loss" refers to an improvement or reduction in weight loss, as compared to the weight loss of using a film or sheet made from a high density polyethylene having a density of about 0.95 or 0.96 utilizing the wear test as described below. The improvement or reduction, in weight loss test can be at least about 30%, at least about 50%, at least about 60%, at least about 70%, at least about 80% or at least about 90%.

The improvement or reduction, regardless how weight loss test is done, can be carried out with a wear test coupon. The test coupon may be any size or shape. For example, it can be rectangular, square, trapezoid, or triangular. Also for example, it can be relatively large or small. For illustrative, it may be 1 inch square and 0.1 inch thick or 50 mm square by 6 mm thick. The size and shape depend on one's preference. The test coupon can be cut from injection molded plaque, film, or sheet of the inner layer (i.e., the grafted polyolefin).

As disclosed herein, the wear test coupon can be dried according to one's preference such as in a vacuum oven at, for example, 20 inches Hg and a temperature of from room temperature (about 20-25° C.) to about 50° C. such as at 35° C. until the weight becomes almost or about constant. The wear test coupon can be mounted in a test chamber with an impinging abrasive particulate or slurry, such as an aqueous sand (for example, a AFS50-70 test sand) slurry at any desired temperature such as room temperature (20-25° C.) on the wear test coupon through a slurry jet nozzle positioned a certain distance about 4 to 20 inch from its surface with a diameter of 0.1 to about 1 inch at a relatively moderate or high slurry jet rate of, for example, 15-16 meters/second with a slurry jet angle of, for example, 90° relative to the surface plane for about 1 to about 10 hours.

The grafted polyolefin is made from a parent polyolefin that has a density of about 0.92 g/cc (ASTM D-792) or less, about 0.90 g/cc or less, about 0.88 g/cc or less, about 0.87 g/cc or less, about 0.86 g/cc or less, about 0.84 to about 0.87 g/cc, or about 0.84 to about 0.86 g/cc.

The parent polyolefin is a polyolefin copolymer comprising ethylene and $\alpha$-olefin comonomers. The polyolefin copolymer comprises at least two monomers, but may incorporate more than two comonomers, such as terpolymers, tetrapolymers and the like. Preferably, the polyolefin copolymer comprises from about 5 wt % to about 50 wt % of the $\alpha$-olefin comonomer (based on the total weight of the polyolefin copolymer), about 15 wt % to about 45 wt %, about 20 wt % to about 40 wt %, or about 25 wt % to about 35 wt %.

The $\alpha$-olefin comonomer contains from 3 to 20 carbons and may be a linear, branched or cyclic $\alpha$-olefin such as selected from the group consisting of propene, 1-butene, 3-methyl-1-butene, 4-methyl-1-pentene, 1-hexene, 1-heptene, 1-octene, 1-decene, 1-dodecene, 1-tetradecene, 1-hexadecene, 1-octadecene, 3-cyclohexyl-1-propene, vinyl cyclohexane, and combinations of two or more thereof. The $\alpha$-olefin comonomer preferably contains 3 to 10 carbons.

The polyolefin copolymer may optionally incorporate a minor amount of other olefinic comonomers; for example cyclic olefins such as norbornene; styrene; dienes such as dicyclopentadiene, ethylidene norbornene and vinyl norbornene; and the like and mixtures thereof. When included, the optional comonomer may be incorporated at a level of about 15 wt % or less, based on the total weight of the polyolefin copolymer.

The polyolefin may be produced by any known method and may be catalyzed with any known polymerization catalyst such as, for example, radical-, Ziegler-Natta- or metallocene-catalyzed polymerizations (e.g., U.S. Pat. Nos. 3,645,992, 5,026,798, 5,055,438, 5,057,475, 5,064,802, 5,096,867, 5,132,380, 5,231,106, 5,272,236, 5,278,272, 5,374,696, 5,420,220, 5,453,410, 5,470,993, 5,703,187, 5,986,028, 6,013,819, 6,159,608, and EP514828.

Blends of two or more polyolefin copolymers may be used, if desired, as long as the density of the blend meets the requirements set forth above for the single polyolefin copolymer.

The grafted polyolefin comprises an $\alpha,\beta$-ethylenically unsaturated carboxylic acid or anhydride grafted to the parent polyolefin. The $\alpha,\beta$-ethylenically unsaturated carboxylic acid or anhydride preferably is selected from the group consisting of maleic anhydride, maleic acid, fumaric acid, acrylic acid, methacrylic acid, itaconic anhydride, itaconic acid, citraconic acid, citraconic anhydride, crotonic acid, crotonic anhydride, methyl crotonic acid, cinnamic acid, endo-bicyclo-[2.2.1]-5-heptene-2,3-dicarboxylic acid, endo-bicyclo-[2.2.1]-5-heptene-2,3-dicarboxylic anhydride, cis-4-cyclohexene-1,2-dicarboxylic acid, cis-4-cyclohexene-1,2-dicarboxylic anhydride and the like and mixtures thereof. Metal salts, anhydrides, esters, amides or imides of the above acids may also be used. More preferably, the $\alpha,\beta$-ethylenically unsaturated carboxylic acid or anhydride is maleic anhydride.

The $\alpha,\beta$-ethylenically unsaturated carboxylic acid or anhydride may be grafted onto the parent polyolefin by any known method. For example, the $\alpha,\beta$-ethylenically unsaturated carboxylic acid or anhydride may be grafted onto the parent polyolefin by the methods disclosed in U.S. Pat. Nos. 3,236,917, 3,932,368, 4,612,155, 4,888,394, 4,950,541, 5,194,509, 5,346,963, 5,523,358, 5,705,565, 5,744,250, 5,955,547, 6,545,091, 7,408,007, US2008/0078445, US2008/0115825, and EP0266994.

The level of the $\alpha,\beta$-ethylenically unsaturated carboxylic acid or anhydride grafted onto the parent polyolefin is preferably from about 0.005 to 10 wt %, based on the total weight of the grafted polyolefin. The level of the $\alpha,\beta$-ethylenically unsaturated carboxylic acid or anhydride may be from about 0.03 to 5 wt % or from about 0.1 to 2 wt %, based on the total weight of the grafted polyolefin. The level of the grafted $\alpha,\beta$-ethylenically unsaturated carboxylic acid or anhydride may be optimized to provide the desirable adhesion to other substrates, such as a metal pipe.

The grafted polyolefin may have Shore A hardness of about 96 or less (ASTM D2240, ISO 868), about 80 or less, about 70 or less, or about 70 to about 50. The grafted polyolefin may be blended with further polymeric materials as long as the Shore A hardness of the blend conforms to the above requirements. The blend preferably comprises the grafted polyolefin with a polyolefin selected from the group consisting of the parent polyolefin copolymers, as described above.

The compositions may be used with additives known in the art. The additives include plasticizers, processing aids, flow enhancing additives, flow reducing additives, lubricants, flame retardants, impact modifiers, nucleating agents to increase crystallinity, antiblocking agents such as silica, thermal stabilizers, UV absorbers, UV stabilizers, dispersants, surfactants, chelating agents, coupling agents, adhesives, primers and the like. One of ordinary skill in the art will recognize that additives may be added to the grafted polyolefin composition using techniques known in the art or variants thereof, and will know the proper amounts for addition based upon typical usage. The total amount of additives used in a grafted polyolefin composition may be up to about 15 weight % (based upon the weight of the grafted polyolefin composition).

However, a tackifier or tackifier resin such as a variety of natural and synthetic resins and rosin materials. Such tackifier may be liquid, semi-solid to solid, or solid, including complex amorphous materials generally in the form of mixtures of organic compounds having no definite melting point and no tendency to crystallize. Such resins can provide substantial and improved tackiness to the composition and may diffuse out of the composition during the production of the pipe disclosed herein. Other tackifiers include para-coumarone-indene resins, (poly)terpene resins, butadiene-styrene resins, polybutadiene resins, hydrocarbon resins, or rosins.

The grafted polyolefin compositions may contain additives that effectively reduce the melt flow of the resin, which may be present in any amount that permits production of thermoset compositions. The use of such additives will enhance the upper end-use temperature and reduce creep of the pipes produced therefrom. The cured grafted polyolefin compositions may have enhanced resistance to the low molecular weight aromatic fraction and naptha commonly contained in oil sand slurries.

Melt flow reducing additives include organic peroxides, such as 2,5-dimethylhexane-2,5-dihydroperoxide, 2,5-dimethyl-2,5-di(tert-butylperoxy)hexane-3, di-tert-butyl peroxide, tert-butylcumyl peroxide, 2,5-dimethyl-2,5-di(tert-butylperoxy)hexane, dicumyl peroxide, $\alpha,\alpha'$-bis(tert-butylperoxyisopropyl)benzene, n-butyl-4,4-bis(tert-butylperoxy)valerate, 2,2-bis(tert-butylperoxy)butane, 1,1-bis(tert-butylperoxy)cyclohexane, 1,1-bis(tert-butylperoxy)-3,3,5-trimethyl-cyclohexane, tert-butyl peroxybenzoate, benzoyl peroxide, and the like and mixtures combinations thereof. Preferably the organic peroxides decompose at a temperature of about 100° C. or higher to generate radicals. More preferably, the organic peroxides have a decomposition temperature that affords a half life of 10 hours at about 70° C. or higher to provide improved stability for blending operations. The organic peroxides may be added at a level of about 0.01 to about 10 wt %, or about 0.5 to about 3 wt %, based on the total weight of the grafted polyolefin composition.

If desired, initiators such as dibutyltin dilaurate may also be present in the grafted polyolefin composition at about 0.01 to about 0.05 wt %, based on the total weight of the grafted polyolefin composition. Also if desired, inhibitors such as hydroquinone, hydroquinone monomethyl ether, p-benzoquinone, and methylhydroquinone may be added for the purpose of enhancing control to the reaction and stability. The inhibitors may be added at a level of less than about 5 wt %, based on the total weight of the composition.

Alternative melt flow reducing additives include known peroxide-silanol additives which commonly include a peroxide (as described above), a silane and a catalyst. These additive systems provide moisture curable materials. Such systems may be added in a concentrate form, such as commercially available under the SILCAT trademark (Momentive Performance Materials, Wilton, Conn., USA).

The grafted polyolefin composition may further comprise about 0.1 to about 80 weight % filler based on the total weight of the filled composition.

Preferably, the filler is abrasion-resistant filler. The filler may be reinforcing filler or non-reinforcing filler. Specific examples of preferred reinforcing fillers include high strength fibers such as fiberglass, continuous glass fiber, polyaramide fiber, KEVLAR (aramid fiber, a product of E. I. du Pont de Nemours and Company (DuPont), one or more fibers made from one or more aromatic polyamides, wherein at least 85% of the amide (—CONH—) linkages are attached directly to two aromatic rings), graphite, carbon fiber, silica, quartz, ceramic, silicon carbide, boron, alumina, alumina-silica, polyethylene, ultrahigh molecular weight polyethylene, polyimide, liquid crystal polymers, polypropylene, polyester, polyamide and the like. For example, US2006/0124188 and US2006/0151042 disclose fiber-reinforced pipe liners. Specific examples of non-reinforcing fillers include particles of abrasion-resistant minerals, marble, slate, granite, sand, potters' sand, silicates, limestone, clay, glass, quartz, metallic powders, aluminum powders, stainless steel powders, zinc metal, refractory metal borides (such as borides of aluminum, niobium, silicon, tantalum, titanium, tungsten, and zirconium), carbides (such as carbides of boron, niobium, silicon, tantalum, titanium, tungsten and zirconium), nitrides (such as nitrides of aluminum, boron, niobium, silicon, tantalum, titanium, tungsten and zirconium), oxides (such as oxides of aluminum, niobium, silicon, tantalum, titanium, tungsten and zirconium), silicon carbide, alumina, fused combinations of alumina and zirconia, calcium carbonate, barium sulfate, magnesium silicate and the like and combinations thereof.

The size of the filler incorporated in the grafted polyolefin composition depends on the thickness and diameter of the grafted polyolefin pipe and should be smaller than the thickness of the grafted polyolefin pipe. Preferably, a mixture of particle sizes is used to provide a higher density (percentage by volume) of filler incorporated. For abrasion-resistant fillers, this may result in a higher abrasion resistance of the filled grafted polyolefin pipe. Filled polymeric pipes are known (U.S. Pat. Nos. 3,498,827, 4,042,559, 4,254,165, 4,407,893, 5,091,260, 5,562,989, and GB 2028461).

Grafted Polyolefin Pipe

The article in the form of a pipe comprising the grafted polyolefin composition comprises an innermost layer having a thickness of about 0.001 to about 102 mm (about 0.00004 to about 4 inches) of the grafted polyolefin composition. The pipe may have a hollow circular profile and the wall thickness may be generally uniform around the circumference of the pipe. This should not be taken as limiting. The pipe may have any profile and the wall thickness may vary around the circumference of the pipe as desired. The grafted polyolefin composition is positioned as the innermost layer to provide superior abrasion-resistance. The grafted polyolefin pipe thickness provides not only a long lifetime under extreme abrasive end-use conditions, but also provides desirable high burst strength under the high temperature conditions contemplated herein. Preferably, the grafted polyolefin layer has a thickness of about 3.2 to about 102 mm (about 0.125 to about 4 inches), or about 6.3 to about 76 mm (about 0.25 to about 3 inches), or about 13 to about 51 mm (about 0.5 to about 2 inches) to provide greater levels of end-use lifetime, burst strength and temperature resistance.

The grafted polyolefin pipe may have any dimensions (including outside diameter, inside diameter and length) required to meet the end use needs. For example but not limitation, the grafted polyolefin pipe preferably has an outer diameter (OD) of about 2.54 to about 254 cm (about 1 to about 100 inches), more preferably, about 25.4 to about 152 cm (about 10 to about 60 inches) and most preferably, about 51 to about 102 cm (about 20 to about 40 inches). For example but not limitation the grafted polyolefin pipe preferably has a length of about 1.5 to about 12.2 m (about 5 to about 40 feet), more preferably about 3.1 to about 9.1 m (about 10 to about 30 feet) and most preferably about 5.5 to about 6.7 m (about 18 to 22 feet) to provide a convenient length for storage, transport, handling and installation.

The grafted polyolefin pipe may be produced by any suitable process. For example, the grafted polyolefin pipe may be formed by melt extrusion, melt coextrusion, slush molding, rotomolding, rotational molding or any other procedures known in the art. For example, the grafted polyolefin pipe may be produced by rotational or slush molding processes. The grafted polyolefin composition may be in the form of powder, microbeads or pellets for use in rotational molding processes. Methods for rotational molding of pipes are known (U.S. Pat. No. 4,115,508, U.S. Pat. No. 4,668,461, and ZA9607413). For example, ZA9607413 discloses wear-resistant composite pipe linings produced through rotational molding a mixture of a polymeric material with an abrasion-resistant particulate material. Methods for rotational molding with polymer powders are known (U.S. Pat. Nos. 3,784,668; 3,876,613; 3,891,597; 3,974,114; 4,029,729; 4,877,562; 5,366,675; 5,367,025 and 5,759,472). U.S. Pat. No. 3,974,114 discloses rotational molding of articles with poly(ethylene-co-acrylic acid) copolymer powders. Methods for rotational molding with polymer microbeads are known (U.S. Pat. No. 5,886,068; EP1422059; and EP1736502). U.S. Pat. No. 5,886,068 discloses rotational molding processes using blends of micropellets. Methods for rotational molding with polymer pellets are known (U.S. Pat. Nos. 4,032,600; 4,185,067; 5,232,644; and EP0778088). Methods for slush molding with polymer powders are known (U.S. Pat. No. 6,218,474 and EP1169390).

Preferably, the grafted polyolefin pipes disclosed herein are formed by melt extrusion and coextrusion processes that are particularly preferred processes for formation of "endless" products. Methods for extruding polymers in the form of pipe are known (U.S. Pat. Nos. 2,502,638; 3,538,209; 3,561,493; 3,755,168; 3,871,807; 3,907,961; 3,936,417; 4,069,001; 4,123,487; 4,125,585; 4,196,464; 4,203,880; 4,301,060; 4,377,545; 4,402,658; 4,465,449; 4,663,107; 4,888,148; 5,028,376; 5,089,204; 5,514,312; 5,518,036; 5,643,526; 5,842,505; 5,976,298; 6,174,981; 6,241,840; 6,418,732; 6,469,079; 6,787,207; US20050167892; US20070117932; EP0222199; EP1574772; WO95/07428; WO2000/018562; WO2006/090016; and WO2006/134228). The molten polymer is forced through an annular die and a mandrel to provide the hollow circular profile of the pipe with the inner pipe diameter controlled by the size of the mandrel. The diameter of the pipe may also be controlled through the application of air pressure inside the pipe. The outer diameter may be controlled with external sizing dies or sleeves. The pipe is cooled to form the final shape. Multilayer pipe is produced similarly using a multilayer annular die that is fed by two or more extruders.

Multilayer Grafted Polyolefin Pipe.

The article may be in the form of a multilayer pipe comprising an innermost layer of the grafted polyolefin composition and an outside layer comprising a polymeric material. Examples of preferred polymeric materials for the outside layer include poly(meth)acrylics, polyacrylates, urethane modified polyacrylics, polyester modified polyacrylics, polystyrenes, polyolefins, polyethylenes (such as high density polyethylene, low density polyethylene, linear low density polyethylene, ultralow density polyethylene), polypropylenes, polyurethanes, polyureas, epoxy resins, polyesters (such as poly(ethylene terephthalate), poly(1,3-propyl terephthalate), poly(1,4-butylene terephthalate), PETG, poly(ethylene-co-1,4-cyclohexanedimethanol terephthalate)), alkyd resins, polyamides (such as nylons, nylon 6, nylon 46, nylon 66, nylon 612), polyamideimides, polyvinyls, phenoxy resins, amino resins, melamines, chlorine-containing resins, chlorinated polyethers, fluorine-containing resins, polyvinyl acetals, polyvinyl formals, poly(vinyl butyrate)s, polyacetylenes, polyethers, silicone resins, ABS resins, polysulfones, polyamine sulfones, polyether sulfones, polyphenylene sulfones, polyvinyl chlorides, polyvinylidene chlorides, polyvinyl acetates, polyvinyl alcohols, polyvinyl carbazoles, butyrals, polyphenylene oxides, polypyrroles, polyparaphenylenes, ultraviolet-curing resins, cellulose derivatives, diethylene glycol bis-allyl carbonate poly-4-methylpentene, polytetrafluoroethylene, polytrifluoroethylene, polyvinylidene fluoride, poly(ethylene-co-glycidylmethacrylate), poly(ethylene-co-methyl (meth)acrylate-co-glycidyl acrylate), poly(ethylene-co-n-butyl acrylate-co-glycidyl acrylate), poly(ethylene-co-methyl acrylate), poly(ethylene-co-ethyl acrylate), poly(ethylene-co-butyl acrylate), acid copolymers, acid terpolymers, poly(ethylene-co-(meth)acrylic acid), ionomers, ionomer terpolymers, metal salts of poly(ethylene-co-(meth)acrylic acid), poly((meth)acrylates), poly(ethylene-co-carbon monoxide), poly(ethylene-co-vinyl acetate), poly(ethylene-co-vinyl alcohol), polybutylene, poly (cyclic olefins), syndiotactic polystyrene, poly(4-hydroxystyrene), novalacs, poly(cresols), polycarbonates, poly(bisphenol A carbonate), polysulfides, poly(phenylene sulfide), poly(2,6-dimethylphenylene oxide), elastomers, rubbers, thermoplastic elastomers and the like and copolymers thereof and mixtures thereof.

More preferably, the polymeric materials are selected from the group consisting of rubbers, elastomers, thermoplastic elastomers, acid terpolymers, ionomer terpolymers and the like and combinations thereof. Rubbers and elastomers are generally categorized as diene elastomers, saturated elastomers, thermoplastic elastomers and inorganic elastomers. Specific examples of rubbers and elastomers include natural rubber, polyisoprene, butyl rubber (copolymer of isobutylene and isoprene), polybutadiene, styrene butadiene (SBR, copolymer of polystyrene and polybutadiene), nitrile rubber (copolymer of polybutadiene and acrylonitrile, also referred to as "buna N rubbers"), silicone RTV, FKM VITON (DuPont) (copolymer of vinylidene fluoride and hexafluoropropylene), SANTOPRENE (Advanced Elastomer Systems, LP, Akron, Ohio), fluorosilicone rubber, EPM and EPDM rubber (ethylene propylene rubber, a copolymer of polyethylene and polypropylene), polyurethane rubber, polyurea rubber, resilin, polyacrylic rubber (ABR), epichlorohydrin rubber (ECO), polysulfide rubber, chlorosulfonated polyethylene (CSM, HYPALON (DuPont)) and the like. Thermoplastic elastomers are generally categorized as styreneics (S-TPE), copolyesters (COPE), polyurethanes (TPU), polyamides (PEBA), polyolefin blends (TPO), polyolefin alloys (TPV), reactor TPO(R-TPO), polyolefin plastomers (POP), polyolefin elastomers (POE) and the like. Acid terpolymers are made from α-olefins, α,β-ethylenically unsaturated carboxylic acids and preferably about 10 to about 25 wt % other unsaturated comonomers (all as described above).

The polymer material layer may have any thickness. Preferably, the polymer material layer is about 0.1 to about 102 mm (about 0.004 to about 4 inches), or about 1 to about 25.4 mm (about 0.04 to about 1 inch) or about 2.5 to about 12.7 mm (about 0.1 to about 0.5 inch) thick.

Tielayers may be included between any of the layers to enhance the adhesion between the layers. Any material may be used in tielayers, such as anhydride- or acid-grafted materials. The preferred anhydrides and acids are α,β-ethylenically unsaturated carboxylic acid comonomers selected from the group consisting of acrylic acid, methacrylic acid, itaconic acid, maleic acid, maleic anhydride, fumaric acid, monomethyl maleic acid, and mixtures thereof. Most preferred anhydrides and acids are selected from the group consisting of acrylic acid, maleic anhydride and mixtures thereof. Preferably, the materials to be grafted are selected from the preferred polymeric materials recited above.

Fiber-Reinforced Grafted Polyolefin Pipe

The article may be in the form of a multilayer pipe comprising an innermost layer having a thickness of about 0.001 to about 102 mm (0.00004 to 4 inches) comprising the grafted polyolefin composition and an outer layer comprising fiber reinforcement and optionally thermoset resin.

The article also may be in the form of a multilayer pipe comprising an innermost layer having a thickness of about 0.001 to about 102 mm (0.00004 to 4 inches) comprising the grafted polyolefin composition; an intermediate layer comprising a polymeric material; and an outer layer comprising a fiber reinforcement and optionally a thermoset resin.

The fiber reinforcement may be a filament, warp yarn, tape, unidirectional sheet, mat, cloth, knitted cloth, paper, nonwoven fabric or woven fabric, or mixtures thereof. The fiber preferably comprises a high strength fiber such as fiberglass, continuous glass fiber, polyaramide fiber, aramid fiber, graphite, carbon fiber, silica, quartz, ceramic, silicon carbide, boron, alumina, alumina-silica, polyethylene, ultrahigh molecular weight polyethylene, polyimide, liquid crystal polymers, polypropylene, polyester, polyamide and the like, and is preferably about 3 to about 30 μm thick.

The fiber may be impregnated with a resin ("prepreg"), such as thermoplastic or preferably thermoset resins. Suitable resins for impregnating the fiber layers include polyester, aromatic, aliphatic, cycloaliphatic or anhydride epoxy resins, vinylester, vinyl, acrylic, modified acrylic, urethane, phenolic, polyimide, bismaleimide, polyurea, siloxane-modified resins and the like and combinations thereof.

Fiber-reinforcement of thermoplastic pipe is known (U.S. Pat. Nos. 4,081,302; 4,521,465; 5,629,062; 5,931,198; 6,737,134; 7,018,691; US2006/0151042; and WO2004/068016).

An adhesive may be applied to the grafted polyolefin pipe and multilayer grafted polyolefin pipe prior to the application of the exterior reinforcement layer and/or an adhesive may be applied to the reinforcement layer after its application to the grafted polyolefin pipe and multilayer grafted polyolefin pipe. The exterior surface of the grafted polyolefin pipe and multilayer grafted polyolefin pipe may be heated to enhance the adhesion and/or embedding of the reinforcement layer. Suitable adhesives may include the impregnated resins described above or any adhesive known in the art.

The fiber reinforcement may be applied to the grafted polyolefin pipe and multilayer grafted polyolefin pipe by any method known in the art. For example, the fiber reinforcement may be applied using known filament winding processes through winding the fiber reinforcement onto the grafted polyolefin pipe and multilayer grafted polyolefin pipe or by wrapping the fiber reinforcement around the grafted polyolefin pipe and multilayer grafted polyolefin pipe.

Grafted Polyolefin-Lined Metal Pipe

The article may be in the form of a multilayer pipe comprising an innermost layer having a thickness of about 0.001 to about 102 mm (0.00004 to 4 inches) comprising the grafted polyolefin composition and an outer layer comprising a metal, preferably in the form of a metal pipe.

The monolayer or multilayer grafted polyolefin composition (such as in the form of pipe, film, or sheet) may be attached (adhered) to the metal outer layer or not attached. The grafted polyolefin or multilayer grafted polyolefin compositions may be self-adhered to the metal layer or adhered through the use of an adhesion primer, coating, or layer. As used herein, when the grafted polyolefin composition is said to be "self-adhered" to the metal layer, it is meant that there is no intermediate layer such as a primer or thin adhesive layer between the metal and the grafted polyolefin or multilayer grafted polyolefin composition. The grafted polyolefin compositions described herein have the advantage of forming high adhesion to the metal pipe.

The pipe may comprise an innermost layer comprising the grafted polyolefin composition; an intermediate layer comprising a polymer material (such as those polymeric materials described above); and an outer layer comprising metal.

The pipe may comprise an innermost layer comprising the grafted polyolefin composition; an intermediate layer comprising a polymer material; and an outer layer comprising metal, wherein the grafted polyolefin layer is adhered to the polymer material layer and the polymer material layer is adhered to the metal layer.

The pipe may comprise an innermost layer comprising the grafted polyolefin composition; an intermediate layer comprising a polymer material; and an outer layer comprising metal, wherein the grafted polyolefin layer is self-adhered to the polymer layer and the polymer layer is self-adhered to the metal layer.

The pipe may further comprise an intermediate layer comprising a fiber reinforcement material comprising a high strength fiber and optionally a thermoset resin as described above.

Preferably, the metal pipe comprises carbon steel, steel, stainless steel, cast iron, galvanized steel, aluminum, copper and the like. More preferably the metal pipe comprises carbon steel to provide the physical properties required for the material conveying processes contemplated herein.

The metal pipe may have any dimensions, including thickness, outer diameter, inner diameter and length suitable for the intended use. The pipe may have a hollow, substantially circular profile and the wall thickness may be generally uniform around the circumference of the pipe, or the pipe may have any profile and the wall thickness may vary around the circumference of the pipe as desired. For example but not limitation, the metal pipe may have a thickness of about 6.3 to about 51 mm (about 0.25 to about 2 inches, about 9.5 to about 38 mm (about 0.375 to about 1.5 inches) or about 13 to about 25.4 mm (about 0.5 to about 1 inch). For example but not limitation, the metal pipe may have an OD of about 5.1 to about 254 cm (about 2 to about 100 inches), about 25.4 to about 152 cm (about 10 to about 60 inches) or about 51 to about 102 cm (about 20 to about 40 inches). For example but not limitation the metal pipe may have a length of about 1.5 to about 12.2 m (about 5 to about 40 feet), about 3.1 to about 9.1 m (about 10 to about 30 feet) or about 5.5 to about 6.7 m (about 18 to 22 feet) to provide a convenient length for storage, transport, handling and installation.

The grafted polyolefin-lined metal pipe may be produced by any known method. For example, the grafted polyolefin pipe and multilayer grafted polyolefin pipe may serve as a liner for a metal pipe. Methods for lining a pipe with a polymeric liner are known (U.S. Pat. Nos. 3,315,348; 3,429,954; 3,534,465; 3,856,905; 3,959,424; 4,207,130; 4,394,202; 4,863,365; 4,985,196; 4,998,871; 5,072,622; 5,320,388; 5,374,174; 5,395,472; 5,551,484; 5,810,053; 5,861,116; 6,058,978; 6,067,844; 6,240,612; 6,723,266; 2006/0093436; 2006/0108016; US2006/0124188; US2006/0151042; and EP0848659).

The inside surface of the metal pipe may be pretreated to provide enhanced adhesion and stability. Such treatments include descaling by sand-, metal grit- or shot-blasting, acid etching, cleaning the metal surface through solvent or chemical washes to remove grease and/or oxide layers, and the application of adhesion primers, coatings, or layers.

A grafted polyolefin-lined metal pipe may be prepared by pulling or inserting a preformed grafted polyolefin pipe or multilayer grafted polyolefin pipe into a preformed metal pipe wherein the outer diameter of the grafted polyolefin pipe is less than the interior diameter of the metal pipe. This method to produce a grafted polyolefin-lined metal pipe includes the following embodiments.

The method comprises (i) pulling or inserting a pre-formed grafted polyolefin pipe or multilayer grafted polyolefin pipe into the metal pipe; (ii) heating the grafted polyolefin-lined metal pipe above the softening point of the grafted polyolefin composition; and (iii) allowing the metal pipe to cool.

The method comprises (i) heating a metal pipe above the softening point of the grafted polyolefin composition; (ii) pulling or inserting a pre-formed grafted polyolefin pipe or multilayer grafted polyolefin pipe into the heated metal pipe; and (iii) allowing the metal pipe to cool.

The method comprises (i) coating a layer of an adhesive or adhesion primer onto the outside surface of the grafted polyolefin pipe or multilayer grafted polyolefin pipe; and (ii) pulling or inserting the adhesive-treated grafted polyolefin pipe or multilayer grafted polyolefin pipe into the metal pipe.

The method comprises (i) coating a layer of an adhesive or adhesion primer onto the inside surface of the metal pipe; and (ii) pulling or inserting the grafted polyolefin pipe or multilayer grafted polyolefin pipe into the adhesive-treated metal pipe.

The method comprises (i) coating a layer of an adhesive or adhesion primer onto the outside surface of the grafted polyolefin pipe or multilayer grafted polyolefin pipe; (ii) pulling or inserting the adhesive-treated grafted polyolefin pipe or multilayer grafted polyolefin pipe into the metal pipe; (iii) heating the metal pipe above the softening point of the grafted polyolefin composition; and (iv) allowing the metal pipe to cool.

The method comprises (i) coating a layer of an adhesive or adhesion primer onto the inside surface of the metal pipe; (ii) pulling or inserting the grafted polyolefin pipe or multilayer grafted polyolefin pipe into the adhesive-treated metal pipe; (iii) heating the metal pipe above the softening point of the grafted polyolefin composition; and (iv) allowing the metal pipe to cool.

The method comprises (i) coating a layer of an adhesive or adhesion primer onto the outside surface of the grafted polyolefin pipe or multilayer grafted polyolefin pipe; (ii) heating a metal pipe above the softening point of the grafted polyolefin composition; (iii) pulling or inserting the adhesive-treated grafted polyolefin pipe or multilayer grafted polyolefin pipe into the heated metal pipe; and (iv) allowing the metal pipe to cool.

The method comprises (i) coating a layer of an adhesive or adhesion primer onto the inside surface of the metal pipe; (ii) heating the adhesively-treated metal pipe above the softening point of the grafted polyolefin composition; (iii) pulling or inserting the grafted polyolefin pipe or multilayer grafted polyolefin pipe into the heated metal pipe; and (iv) allowing the metal pipe to cool.

In a specific embodiment, the method for adhering the grafted polyolefin pipe or multilayer grafted polyolefin pipe to the metal pipe comprises (a) descaling and cleaning the interior surface of the metal pipe; (b) heating the metal pipe to a temperature of about 150 to about 400° C., preferably about 150 to about 300° C. and most preferably of about 175 to about 225° C.; (c) pulling or inserting the grafted polyolefin liner (pipe) or grafted polyolefin multilayer liner (pipe) into the hot metal pipe; and (d) allowing the grafted polyolefin-lined metal pipe to cool to ambient conditions.

For example, preparing a grafted polyolefin lined metal pipe with a self-adhered grafted polyolefin liner (pipe) includes descaling the interior of the metal pipe, followed by degreasing and cleaning The metal pipe is then heated, as in an oven, a furnace, a gas ring burner, electrical resistive heating elements, radiant heaters, induction heating, high frequency electrical heaters and the like, and the heating may be discontinued throughout the remainder of the process or the metal pipe may be continuously heated, as through induction heating, throughout the process. The heating expands the metal pipe. A grafted polyolefin liner (pipe) or grafted polyolefin multilayer liner (pipe) is pulled or inserted into the hot metal pipe. The grafted polyolefin or multilayer grafted polyolefin liner preferably has an outside diameter (OD) that is no greater than about 0.1 inch (2.5 mm) less than the inside diameter (ID) of the unheated metal pipe, more preferably an OD no greater than about 0.05 inch (1.3 mm) less than the ID, even more preferably, an OD no greater than about 0.025 inch (0.64 mm) less than the ID. Most preferably, the grafted polyolefin and multilayer grafted polyolefin liner OD is about equivalent to the ID of the unheated metal pipe. As the heated metal pipe-grafted polyolefin liner structure cools, the metal pipe reduces in diameter and makes intimate contact with the outside surface of the grafted polyolefin liner, causing it to soften and self-adhere to the inside surface of the metal pipe. Alternatively, the grafted polyolefin liner (pipe) or multilayer grafted polyolefin liner (pipe) may be inserted into the metal pipe prior to heating.

If desired, prior to heating the metal pipe and inserting the grafted polyolefin and multilayer grafted polyolefin liner (pipe), an adhesive primer, coating or layer may be applied to the interior surface of the metal pipe, the exterior surface of the grafted polyolefin and multilayer grafted polyolefin liner, or both, in the form of a solution or solid to provide enhanced interlayer adhesion.

A method to produce a grafted polyolefin-lined metal pipe comprises laying up a preformed grafted polyolefin film or sheet or multilayer grafted polyolefin film or sheet into a preformed metal pipe. This method to produce a grafted polyolefin-lined metal pipe includes the following embodiments.

The method comprises (i) laying up the interior of a metal pipe with grafted polyolefin film or sheet or multilayer grafted polyolefin film or sheet; (ii) heating a metal pipe above the softening point of the grafted polyolefin composition; and (iii) allowing the metal pipe to cool.

The method comprises (i) coating a layer of an adhesive or adhesion primer onto the outside surface of the grafted polyolefin film or sheet or multilayer grafted polyolefin film or sheet; and (ii) laying up the interior of a metal pipe with grafted polyolefin film or sheet or multilayer grafted polyolefin film or sheet.

The method comprises (i) coating a layer of an adhesive or adhesion primer onto the inside surface of the metal pipe; and (ii) laying up the interior of a metal pipe with grafted polyolefin film or sheet or multilayer grafted polyolefin film or sheet.

The method comprises (i) coating a layer of an adhesive or adhesion primer onto the outside surface of the grafted polyolefin film or sheet or multilayer grafted polyolefin film or sheet; (ii) laying up the interior of a metal pipe with grafted polyolefin film or sheet or multilayer grafted polyolefin film or sheet; (iii) heating a metal pipe above the softening point of the grafted polyolefin composition; and (iv) allowing the metal pipe to cool.

The grafted polyolefin film or sheet and the multilayer grafted polyolefin film or sheet may be produced by any art method. Preferably the film or sheet is produced through melt processes, such as extrusion blown film processes, extrusion film or sheet melt casting processes, sheet profile extrusion processes, calendar processes and the like. The films and sheets may undergo secondary formation processes, such as the plying together of preformed sheets to produce thicker sheets through known calendaring processes.

An example method for preparing grafted polyolefin lined metal pipe with a self-adhered grafted polyolefin sheet includes descaling the interior of the metal pipe, followed by degreasing and cleaning The interior of the metal pipe is then covered with the grafted polyolefin sheet, preferably with the sheet overlapping onto itself 0.5 to 4 inches to form a seam. The seam may be heat fused or the excess sheet may be trimmed and the sheet ends may be heat fused, as desired. The metal pipe is then heated, as described above, to the temperature range of about 150 to about 400° C., preferably to the temperature range of about 150 to about 300° C. and most preferably to the temperature range of about 175 to about 225° C. As the heated metal pipe-grafted polyolefin sheet structure cools, the metal pipe makes intimate contact with the outside surface of the grafted polyolefin sheet, causing it to soften and self-adhere to the inside surface of the metal pipe.

If desired, prior to heating the metal pipe and inserting the grafted polyolefin and multilayer grafted polyolefin film or sheet, an adhesive primer, coating or layer may be applied to the interior surface of the metal pipe, the exterior surface of the grafted polyolefin and multilayer grafted polyolefin film or sheet or both, in the form of a solution or solid to provide enhanced interlayer adhesion.

The grafted polyolefin-lined metal pipe may be produced by powder coating processes. Methods for coating the inner or outer surfaces of a pipe with polymeric powder coatings are known (U.S. Pat. Nos. 3,004,861; 3,016,875; 3,063,860; 3,074,808; 3,138,483; 3,186,860; 3,207,618; 3,230,105; 3,245,824; 3,307,996; 3,488,206; 3,532,531; 3,974,306; 3,982,050; 4,007,298; 4,481,239; and EP778088). For example, U.S. Pat. No. 4,407,893 discloses powder coating processes to produce abrasion-resistant pipes with 0.04-inch thick coatings of sand-filled blends comprising polyethylenes and ionomers.

The grafted polyolefin composition may be produced in the form of a powder by any known method. Methods for producing polymer powders (comprising acid copolymers and ionomers), and powder coating compositions are known (U.S. Pat. Nos. 3,933,954; 3,959,539; 4,056,653; 4,237,037; 5,344,883; 6,107,412; 6,132,883; 6,284,311; 6,544,596; 6,680,082; and EP1169390). Preferably, the grafted polyolefin composition is cryogenically (for example, with liquid nitrogen as the cooling medium) ground into a powder. Physically grinding the grafted polyolefin composition creates irregularly shaped particles of size and shape suitable for achieving constant flow through the application equipment. Preferably, the grafted polyolefin composition powder has a particle size or average particle size of about 20 to about 500 µm. To obtain the suitable particle size, the grinding step may include a sieving or classification step to eliminate large- and fine-sized particles. For fluid bed coating processes, the preferred particle size is about 75 to about 350 µm.

A method to produce a grafted polyolefin-lined metal pipe comprises (i) heating a metal pipe above the softening point of a grafted polyolefin composition; (ii) fluidizing the grafted polyolefin composition in the form of a powder; (iii) supplying the fluidized grafted polyolefin powder to the inside of the heated metal pipe until the desired grafted polyolefin thickness is achieved; and (iv) allowing the metal pipe to cool.

The heated metal pipe may be in a vertical orientation or a horizontal orientation during step (iii). The heated metal pipe may be rotated during step (iii). For example, the heated metal pipe may be rotated at a rate to force the polyolefin powder to the inside diameter of the metal pipe during step (iii).

The powder coating process comprises heating the metal pipe to a temperature above the softening point of the grafted polyolefin composition and supplying a fluidized powder of the grafted polyolefin composition into the heated pipe for a time sufficient to provide the desired grafted polyolefin coating thickness. The metal pipe is preferably heated to the temperature range of about 150 to about 400° C., preferably about 200 to about 350° C. and most preferably about 250 to about 300° C. The metal pipe may be heated as described above and the heating may be discontinued throughout the remainder of the process or the metal pipe may be continuously heated throughout the process. Portions of the pipe may be selectively heated. For example, in a fluidized bed method (see below) the metal pipe may be incrementally heated from the top to the bottom to cause the coating to form sequentially from the top to the bottom. Conversely, the metal pipe may be heated from the bottom to the top.

The grafted polyolefin coating may be self-adhered to the metal pipe or the interior surface of the metal pipe may be treated with adhesion primers, coatings and layers. The use of adhesion promoting primers and coupling agents for pipe powder coatings is known (U.S. Pat. Nos. 3,016,875; 4,048,355; and 4,481,239).

Pipe powder coating methods may include descaling, degreasing and cleaning the interior of the metal pipe, as described above. The portions of the pipe which are not desired to be coated, for example the metal pipe ends which are meant to be joined together to form the pipeline, may be masked. If desired, prior to feeding the powder, an adhesive primer, coating or layer may be applied to the interior surface of the metal pipe in the form of a solution or solid (powder) to provide enhanced interlayer adhesion. The metal pipe is then heated as described above. The metal pipe temperature may be varied as desired during the coating operation. Preferably, the heated metal pipe may be rotated along its cylindrical axis at a rate of about 1 to about 300 rpm, more preferably about 10 to about 80 rpm. The metal pipe may be rotated slowly to provide good, even coverage of the powder coating or may be rotated fast enough to force the powder to the interior surface of the pipe. The metal pipe may be in a vertical orientation or preferably in a horizontal orientation. If a multilayer coating is desired, different polymeric composition powders may be fed sequentially to provide the different coating layers at the thickness desired. At any stage of the process, abrasion-resistant particles, such as described above as fillers, may be fed into the interior of the metal pipe, either individually or in combination with the powder. For example, the abrasion-resistant particles may be overcoated onto the hot coating while it is still soft and tacky so that the particles adhere to the interior surface of the coating. The coated metal pipe is then allowed to cool to ambient temperatures. If desired, any coating surface roughness may be smoothed through a post-coating operation, such as by hot gas, flame or oven post-treatments.

In a fluidized bed method, the powder is fed with pressurized gas, such as compressed air, nitrogen or argon, from a fluidized bed of the powder into the interior of the hot metal pipe. Alternatively, the hot metal pipe may be placed above the fluidized bed and the fluidized bed allowed to expand into the interior of the hot metal pipe to be coated. As the powder contacts the heated interior surface of the metal pipe, the material coalesces and flows to form a continuous, fused coating. The powder is fed from the fluidized bed until a continuous, uniform coating of the desired thickness is achieved.

In a spray coating method, a spray nozzle, preferably with a deflector disc to force the powder radially out onto the metal pipe interior surface, supported on an extensible boom, is inserted down the centerline of the metal pipe interior. The powder may be fed with pressurized gas, such as compressed air, nitrogen or argon, from a fluidized bed of the powder. Alternatively, the powder may be delivered from a bin to a vibrating feeder into a hopper and then conveyed to the spray nozzle with a pressurized gas. During the coating operation, the spray nozzle, the metal pipe or both may be moved to ensure uniform coating over the interior surface of the pipe. Multiple coats may be applied to provide the desired coating thicknesses.

The grafted polyolefin composition powder may be applied to the inside metal pipe surface through electrostatic spraying processes. For electrostatic spraying applications, the preferred particle size is about 20 to about 120 µm. Preferably, the metal pipe is preheated above the softening point of the grafted polyolefin composition as described above. In electrostatic spraying processes, the grafted polyolefin powder is fed out of a reservoir, such as a fluidized bed, to a spray gun by air pressure. A high voltage, low amperage electrostatic charge is applied to the grafted polyolefin powder by a transfer of electrons from the spray gun to the powder. The charged powder is sprayed onto the cleaned inside surface of the preheated, grounded metal pipe to form the grafted polyolefin coating. Several passes may be required to build up to the desired thickness of the grafted polyolefin coating.

The grafted polyolefin composition coating may be applied to the metal pipe by thermal spraying processes, such as flame (combustion) spraying, two wire arc spraying, plasma spraying, cold spraying and high velocity oxy-fuel spraying. Preferably, the thermal spraying process is a flame spraying process. The grafted polyolefin composition may be in the form of a wire or a rod to serve as a feedstock for flame spraying processes, or it is a powder with preferred particle size of about 1 to about 50 µm. The grafted polyolefin powder is fed to the flame spraying gun in a stream of an inert gas (such as argon or nitrogen) and fed into a flame of a fuel gas (such as acetylene or propane) and oxygen. The grafted polyolefin powder is melted in the flame and with the help of a second outer annular gas nozzle of compressed air is sprayed onto the cleaned inside surface of the preheated metal pipe to form the grafted polyolefin coating. Several passes may be required to build up to the desired thickness of the grafted polyolefin coating. Alternatively, the grafted polyolefin powder may be fed to the flame spray gun using a venturi effect sustained by the fuel gas flow.

The grafted polyolefin compositions may be too soft for the formation of suitable powder to support powder-based processes. Even if suitable powder were produced from the grafted polyolefin compositions, the powder may tend to mass (stick together). Powder-based processes to produce the pipe are therefore not preferred.

The grafted polyolefin-lined metal pipe may be produced by processes similar to the above mentioned rotational or slush molding processes. The grafted polyolefin composition may be in the form of powder, microbeads or pellets. The coating process comprises heating the metal pipe to a temperature above the softening point of the grafted polyolefin composition, horizontally rotating the pipe and supplying the grafted polyolefin composition into the heated pipe for a time sufficient to provide the desired grafted polyolefin coating thickness. The metal pipe may be preheated (such as in an oven), may be constantly heated during the process or both. The grafted polyolefin composition may be fed all at once, batchwise or continuously to the rotating heated metal pipe. After an even coating of the desired thickness of the composition is applied to the inner surface of the metal pipe, the pipe is cooled.

The pipes described herein provide high abrasion-resistance and corrosion resistance for the conveyance of solids and slurries such as found in the agriculture, food and mining industries. The grafted polyolefin layer in the pipes provides very long lifetime, especially desirable for those industries that require long service lifetime due to the great maintenance and replacement complexity and cost. For example, oil slurry mining operations require kilometers of slurry pipelines in extreme environments, such as northern Alberta, Canada, so extended pipe lifetime is very desirable.

A method for transporting an comprises obtaining a pipe- or tube-formed article as described above; preparing an composition suitable for flowing through the article; flowing the composition into one end of the pipe- or tube-formed article and receiving the composition out of the other end of pipe- or tube-formed article. The abrasive material composition may be moved through the pipe by any motive force such as gravity and/or the action of a pump such as a jet pump.

The abrasive material composition may be a slurry, such as a combination of water, oil, air, emulsified materials, particulates, solids and/or the like. A slurry of note is oil sand slurry. In some cases, the abrasive material, such as oil sand slurry, may be at a temperature of about 30° C. or greater, of about 40° C. or greater, or about 50° C. or greater. Oil sand slurries may be prepared as described in, for example, US2006/0249431. The oil sand slurry may be optionally conditioned by transport through the pipe- or tube-formed article, such conditioning comprising for example lump digestion, bitumen liberation, coalescence and/or aeration. Pumping the slurry through a pipeline over a certain minimum distance (such as at least one kilometer, preferably at least two kilometers), allows for conditioning the slurry. This is due to the increased time (such as 10 minutes or greater) in the pipeline, which allows transport through the pipeline to replace conditioning of the oil sand in a batch tumbler. In a low energy extraction process, the mined oil sand is mixed with water in predetermined proportions near the mine site to produce a slurry containing entrained air with density of 1.4 to 1.65 g/cc and preferably a temperature of 20-40° C. Pumping the slurry through a pipeline having a plurality of pumps spaced along its length, preferably adding air to the slurry as it moves through the pipeline, conditions the slurry for further operations to extract bitumen from the slurry.

EXAMPLES

The following Examples are intended to be illustrative of the invention, and are not intended in any way to limit its scope.

Melt Index (MI) was measured by ASTM D1238 at 190° C. using a 2160 g, unless indicated otherwise. A similar ISO test is ISO 1133. Shore A hardness was measured according to ASTM D2240, ISO 868.

Materials Used
GPO1: high density polyethylene (density 0.960 g/cc) grafted with 0.9 wt % maleic anhydride, with MI of 2 g/10 min and Shore A hardness of 98.
GPO2: poly(ethylene-co-hexene) (density 0.918 g/cc) grafted with 1.8 wt % maleic anhydride, with MI of 2 g/10 min and Shore A hardness of 96.
GPO3: poly(ethylene-co-hexene) (density 0.918 g/cc) grafted with 0.95 wt % maleic anhydride, with MI of 2.7 g/10 min and Shore A hardness of 95.
GPO4: an EPDM (density of 0.882 g/cc) grafted with 0.5 wt % maleic anhydride with MI of 23 g/10 min and Shore A hardness of 65.
GPO5: poly(ethylene-co-butene) (density 0.873 g/cc) grafted with 0.9 wt % maleic anhydride, with MI of 3.7 g/10 min and Shore A hardness of 70.
GPO6: poly(ethylene-co-octene) (density 0.863 g/cc) grafted with 0.9 wt % maleic anhydride, with MI of 1.6 g/10 min and Shore A hardness of 60.
ACR: a poly(ethylene-co-n-butylacrylate-co-methacrylic acid) containing 23 wt % n-butylacrylate and 9 wt % methacrylic acid with MI of 5 g/10 min.
EO: a metallocene-catalyzed ethylene-octene copolymer plastomer sold as EXACT 5361 by ExxonMobil Chemical Company, Houston, Tex. (ExxonMobil).
EP1: a metallocene-catalyzed ethylene-propylene copolymer, sold as VISTALON EPM 722 by ExxonMobil.
EP2: a metallocene-catalyzed ethylene-propylene copolymer, sold as VISTAMAXX VM1100 by ExxonMobil.
EP3: EP2 grafted with 2 wt % maleic anhydride.
EPDM: a metallocene-catalyzed ethylene-propylene-diene copolymer, sold as VISTALON 5601 by ExxonMobil.
HDPE1: a high density poly(ethylene).
HDPE2: a high density poly(ethylene) grafted with 1.5 wt % maleic anhydride. S: a styrene block copolymer sold as KRATON G7705-1 by Kraton Polymers, Houston, Tex. (Kraton).
SBS: a styrene-butadiene-styrene block copolymer with a melt index of 3 g/10 min at 200° C./5 kg, sold as KRATON D1153E (Kraton).
SEBS 1: a styrene-ethylene/styrene block copolymer with a melt index of 5 g/10 min at 230° C./5 kg, sold as KRATON G1652M (Kraton).
SEBS 2: a styrene-ethylene/styrene block copolymer grafted with 1.7 wt % maleic anhydride, sold as KRATON FG1901X (Kraton).
SEBS 3: a styrene-ethylene/styrene block copolymer grafted with 1 wt % maleic anhydride, sold as KRATON FG1924X (Kraton).
SIS: a styrene-isoprene-styrene block copolymer with a melt index of 3 g/10 min at 200° C./5 kg, sold as KRATON D111K (Kraton).
EP 3 is an EP 2 grafted with 2 wt % maleic anhydride.

Thickness and diameter in the following tables, unless specifically indicated, are in inches.

Comparative Example CE 1 and Examples 1-7

Abrasion resistance was assessed according to the following procedure. Wear test coupons, 50 mm by 50 mm by 6.35 mm thick, were cut from injection molded plaques of the grafted polyolefins summarized in Table 1. The wear test coupons were dried in a vacuum oven (20 inches Hg) at a temperature of 35° C. until the weight loss was less than 1 mg/day and weighed. The wear test coupons were mounted in a test chamber and a 10 wt % aqueous sand (AFS50-70 test sand) slurry at room temperature (20-25° C.) was impinged on the wear test coupon through a slurry jet nozzle positioned 100 mm from its surface with a diameter of 4 mm at a slurry jet rate of 15-16 meters/second with a slurry jet angle of 90° relative to the surface plane for 2 hours. Example 6 was performed with the 10 wt % aqueous sand slurry at a temperature of 30° C. Example 7 was performed with the 10 wt % aqueous sand slurry at a temperature of 20° C. The wear test coupons were then removed and dried in a vacuum oven (20 inches Hg) at room temperature for at least 15 hours and then reweighed. The results are reported in Table 1.

TABLE 1

| Example | Material | Initial Weight (g) | Final Weight (g) | Weight Loss (g) | Reduction (%)[1] |
|---|---|---|---|---|---|
| CE 1 | GPO1 | 7.9861 | 7.9485 | 0.0376 | 0 |
| 1 | GPO2 | 7.2931 | 7.2811 | 0.0120 | 68 |
| 2 | GPO3 | 7.6168 | 7.6054 | 0.0114 | 70 |
| 3 | GPO4 | 7.4515 | 7.4473 | 0.0042 | 89 |
| 4 | GPO5 | 8.0462 | 8.0462 | 0.0000 | 100 |
| 5 | GPO6 | 7.6168 | 7.6168 | 0.0000 | 100 |
| 6 | GPO5 | 8.0482 | 8.0462 | 0.0020 | 100 |
| 7 | GPO6 | 7.6170 | 7.6168 | 0.0002 | 100 |

[1] The reduction is normalized over the weight loss of Example CE1

Examples 8-16

The grafted polyolefin pipes summarized in Table 2 are made from the materials listed by conventional pipe extrusion and sizing methods with melt extrusion temperatures in the range from about 150° C. to about 225° C. The pipes are cut into 20 foot lengths. "OD"=outer diameter.

TABLE 2

| Example | Material | OD thickness | Thickness | Example | Material | OD thickness | Thickness |
|---|---|---|---|---|---|---|---|
| 8 | GPO5 | 20 | 0.5 | 13 | GPO6 | 32 | 1.5 |
| 9 | GPO6 | 24 | 1.0 | 14 | GPO4 | 26 | 0.4 |
| 10 | GPO5 | 28 | 2.0 | 15 | GPO5 | 30 | 1.0 |
| 11 | GPO2 | 22 | 0.38 | 16 | GPO6 | 34 | 1.8 |
| 12 | GPO3 | 26 | 0.75 | | | | |

Examples 17-22

The grafted polyolefin bilayer pipes summarized in Table 3 are made from the materials listed by conventional multilayer pipe extrusion and sizing methods with melt extrusion temperatures of about 150° C. to about 225° C. The pipes are cut into 20 foot lengths.

TABLE 3

| | Inner Layer | | Outer Layer | | |
|---|---|---|---|---|---|
| Example | Material | Thickness | Material | Thickness | OD thickness |
| 17 | GPO5 | 0.5 | ACR | 0.25 | 20 |
| 18 | GPO3 | 1.0 | EPDM | 0.4 | 24 |
| 19 | GPO5 | 2.0 | HDPE 1 | 0.5 | 28 |
| 20 | GPO6 | 0.38 | SEBS 2 | 0.2 | 22 |
| 21 | GPO4 | 0.75 | SEBS 3 | 0.3 | 26 |
| 22 | GPO6 | 1.5 | HDPE 2 | 0.5 | 32 |

Examples 23-31

Multilayer grafted polyolefin pipes are made from the materials summarized in Table 4 by conventional multilayer pipe extrusion and sizing methods with melt extrusion temperatures of about 150° C. to about 225° C. The tielayer is approximately 1-2 mils thick (0.026-0.051 mm) and is positioned between the inner layer and outer layer to provide adhesion. All Examples also have a tielayer on the outside surface of the outer layer: the structure of the pipe is tielayer/outer layer/tielayer/inner layer. The pipes are cut into 20-foot lengths.

TABLE 4

| | Inner Layer | | Tie Layer | Outer Layer | | OD |
|---|---|---|---|---|---|---|
| Example | Material | Thickness | Material | Material | Thickness | thickness |
| 23 | GPO5 | 0.5 | EP 3 | EO | 0.25 | 20 |
| 24 | GPO3 | 1.0 | EP 3 | EP 1 | 0.4 | 24 |
| 25 | GPO6 | 2.0 | EP 3 | EP 2 | 0.5 | 28 |
| 26 | GPO4 | 0.38 | EP 3 | EPDM | 0.2 | 22 |
| 27 | GPO5 | 0.75 | HDPE 2 | HDPE 1 | 0.3 | 26 |
| 28 | GPO5 | 1.5 | SEBS 2 | S | 0.5 | 32 |
| 29 | GPO6 | 0.45 | SEBS 3 | SBS | 0.2 | 26 |
| 30 | GPO6 | 1.0 | SEBS 2 | SEBS 1 | 0.1 | 30 |
| 31 | GPO4 | 1.8 | SEBS 2 | SIS | 0.3 | 34 |

Examples 32-38

The grafted polyolefin pipe-lined carbon steel pipes summarized in Table 5 are made by inserting the grafted polyolefin pipes listed into 20-foot lengths of carbon steel pipes with 0.75-inch wall thickness and the inner diameter (ID) listed. Prior to lining the pipe, the interior surface of the carbon steel pipe is sandblasted and degreased.

TABLE 5

| Example | Grafted polyolefin pipe (Example) | Carbon steel pipe (ID thickness) | Example | Grafted polyolefin pipe (Example) | Carbon steel pipe (ID thickness) |
|---|---|---|---|---|---|
| 32 | 8 | 22 | 36 | 22 | 34 |
| 33 | 12 | 28 | 37 | 26 | 24 |
| 34 | 15 | 32 | 38 | 29 | 28 |
| 35 | 18 | 26 | | | |

Examples 39-46

The grafted polyolefin pipe-lined pipelines summarized in Table 6 are made by thermally fusing the ends ("butt fusion") of the grafted polyolefin pipes listed through conventional methods and inserting the polymeric pipes into the carbon steel pipes with 0.75-inch wall thickness and the length and the ID listed. Prior to lining the pipe, the interior surface of the carbon steel pipe is sandblasted and degreased.

TABLE 6

| Example | Grafted polyolefin pipe (Example) | Carbon steel pipe (ID thickness) | Example | Grafted polyolefin pipe (Example) | Carbon steel pipe (ID thickness) |
|---|---|---|---|---|---|
| 39 | 9  | 26 | 1   | 43 | 19 |
| 40 | 11 | 24 | 2   | 44 | 24 |
| 41 | 16 | 36 | 3   | 45 | 39 |
| 42 | 17 | 22 | 0.5 | 46 | 30 |

Examples 47-68

The grafted polyolefin pipe-lined carbon steel pipes summarized in Table 7 are made by heating 20 foot lengths of carbon steel pipes with 0.75-inch wall thickness and the ID listed to 200° C.; inserting the grafted polyolefin pipes listed into the hot carbon steel pipes; and allowing the lined pipe to cool to ambient temperatures. Prior to lining the steel pipe, the interior surface is sandblasted and degreased.

TABLE 7

| Example | Grafted polyolefin pipe (Example) | Carbon steel pipe (ID thickness) | Example | Grafted polyolefin pipe (Example) | Carbon steel pipe (ID thickness) |
|---|---|---|---|---|---|
| 47 | 8  | 20 | 58 | 21 | 26 |
| 48 | 9  | 24 | 59 | 22 | 32 |
| 49 | 10 | 28 | 60 | 23 | 20 |
| 50 | 11 | 22 | 61 | 24 | 24 |
| 51 | 12 | 26 | 62 | 25 | 28 |
| 52 | 13 | 32 | 63 | 26 | 22 |
| 53 | 14 | 26 | 64 | 27 | 26 |
| 54 | 15 | 30 | 65 | 28 | 32 |
| 55 | 16 | 34 | 66 | 29 | 26 |
| 56 | 17 | 20 | 67 | 30 | 30 |
| 57 | 20 | 22 | 68 | 31 | 34 |

Preparative Examples PE1-PE9

Grafted polyolefin sheets with a thickness of 0.125 inch and a width of 9 feet are made from the materials summarized in Table 8 by conventional sheet extrusion methods with melt extrusion temperatures of about 150° C. to about 225° C. The sheets are plied together to provide the described thickness by conventional calendering processes.

TABLE 8

| Preparative Example | Material | Sheet Thickness | Preparative Example | Material | Sheet Thickness |
|---|---|---|---|---|---|
| PE1 | GPO5 | 0.5  | PE6 | GPO4 | 1.5  |
| PE2 | GPO5 | 1.0  | PE7 | GPO6 | 0.5  |
| PE3 | GPO5 | 2.0  | PE8 | GPO6 | 1.0  |
| PE4 | GPO6 | 0.25 | PE9 | GPO6 | 1.75 |
| PE5 | GPO3 | 0.75 |     |      |      |

Examples 69-77

The grafted polyolefin-lined carbon steel pipes summarized in Table 9 are made by inserting the grafted polyolefin sheets listed into 20-foot lengths of carbon steel pipes with 0.75-inch wall thickness with the ID listed. Prior to lining the pipe, the interior surface of the carbon steel pipe is sandblasted and degreased. The grafted polyolefin sheets are cut down in size to fit the carbon steel pipe and the seam is butt welded by thermally fusing the ends ("butt fusion"). The grafted polyolefin-lined carbon steel pipe is heated to 200° C. while being rotated in the horizontal axis, and then the lined pipe is cooled to ambient temperatures.

TABLE 9

| Example | Grafted polyolefin pipe (Example) | Carbon steel pipe (ID thickness) | Example | Grafted polyolefin pipe (Example) | Carbon steel pipe (ID thickness) |
|---|---|---|---|---|---|
| 69 | PE1 | 22 | 74 | PE6 | 24 |
| 70 | PE2 | 28 | 75 | PE7 | 28 |
| 71 | PE3 | 32 | 76 | PE8 | 20 |
| 72 | PE4 | 26 | 77 | PE9 | 30 |
| 73 | PE5 | 34 |    |     |    |

The invention claimed is:

1. A pipe- or tube-shaped article having an innermost layer wherein the innermost layer has a thickness of about 3.2 to about 102 mm and comprises a grafted polyolefin, wherein the grafted polyolefin is the only polymer in the innermost layer;
    the grafted polyolefin is produced from a parent polyolefin comprising ethylene and an α-olefin with 3 to 20 carbons and grafted with about 0.005 to about 10 wt % of an α,β-ethylenically unsaturated carboxylic acid or anhydride; and
    the innermost layer does not comprise a tackifier.

2. The article of claim 1 wherein
    the grafted polyolefin is produced from a parent polyolefin comprising ethylene and an α-olefin with 3 to 20 carbons; and
    the parent polyolefin has a density of about 0.88 g/cc (ASTM D-792) or less.

3. The article of claim 1 wherein the innermost layer has a reduction in weight loss by at least 50% when exposed to a sand slurry stream for 2 hours, as compared to an innermost layer produced from a high density polyethylene grafted with 0.9 weight % maleic anhydride.

4. The article of claim 2 wherein the innermost layer has a reduction in weight loss by at least 60% when exposed to a sand slurry stream for 2 hours, as compared to an innermost layer produced from a high density polyethylene grafted with 0.9 weight % maleic anhydride.

5. The article of claim 2 wherein
    the parent polyolefin has a density of about 0.87 or lower; and
    the α,β-ethylenically unsaturated carboxylic acid or anhydride is selected from the group consisting of maleic anhydride, maleic acid, fumaric acid, acrylic acid, methacrylic acid, itaconic anhydride, itaconic acid, citraconic acid, citraconic anhydride, crotonic acid, crotonic anhydride, methyl crotonic acid, cinnamic acid, endo-bicyclo-[2.2.1]-5-heptene-2,3-dicarboxylic acid, endo-bicyclo-[2.2.1]-5-heptene-2,3-dicarboxylic anhydride, cis-4-cyclohexene-1,2-dicarboxylic acid, cis-4-cyclohexene-1,2-dicarboxylic anhydride and mixtures thereof.

6. The article of claim 5 wherein the α,β-ethylenically unsaturated carboxylic acid or anhydride is maleic anhydride and the innermost layer has a thickness of about 6.3 to about 76 mm.

7. A method comprising laying up a pre-formed film or sheet into a preformed metal or plastic pipe to produce a grafted polyolefin-lined metal or plastic pipe wherein the film or sheet is the same as the innermost layer recited in claim 2.

8. The method of claim 7 further comprising heating the metal or plastic pipe above the softening point of the grafted polyolefin and allowing the metal or plastic pipe to cool to produce the grafted polyolefin-lined metal or plastic pipe.

9. The method of claim 7 further comprising, prior to the laying up, producing a pipe- or tube-shaped article from the preformed film or sheet and inserting the pipe- or tube-shaped article into the interior of the pipe.

10. The method of claim 9 further comprising producing an abrasive material; flowing the abrasive material into one end of the pipe- or tube-shaped article; receiving the abrasive material out of the other end of the pipe- or tube-shaped article for transporting the abrasive material thereby transporting the abrasive material.

11. The method of claim 10 wherein the abrasive material is oil sand.

12. A pipe- or tube-shaped article comprising an innermost layer and an outer layer wherein
the innermost layer has a thickness of about 0.001 to about 102 mm and comprises a grafted polyolefin, wherein the grafted polyolefin is the only polymer in the innermost layer;
the grafted polyolefin is produced from a parent polyolefin comprising ethylene and an α-olefin with 3 to 20 carbons and grafted with about 0.005 to about 10 wt % of an maleic anhydride;
the parent polyolefin has a density of about 0.87 or lower;
the innermost layer does not comprise a tackifier; and
the outer layer comprises a fiber reinforcement material and optionally a thermoset resin.

13. The article of claim 12 further comprising an intermediate layer between the innermost layer and the outer layer and the intermediate layer comprises rubber, elastomer, thermoplastic elastomer, acid terpolymer, ionomer terpolymer, or mixtures of two or more thereof.

14. The article of claim 12 further comprising an outermost layer which comprises carbon steel, stainless steel, cast iron, galvanized steel, aluminum, copper, or alloys of two or more thereof.

15. The article of claim 14 further comprising an intermediate layer between the innermost layer and the outer layer and the intermediate layer comprises rubber, elastomer, thermoplastic elastomer, acid terpolymer, ionomer terpolymer, or mixtures of two or more thereof.

16. A pipe- or tube-shaped article having an innermost layer wherein
the innermost layer has a thickness of about 3.2 to about 102 mm and comprises a grafted polyolefin, wherein the grafted polyolefin is the only polymer in the innermost layer;
the grafted polyolefin is produced from a parent polyolefin comprising ethylene and an α-olefin with 3 to 20 carbons and grafted with anhydride; and
the innermost layer does not comprise a tackifier.

17. The article of claim 16 wherein
the innermost layer has a reduction in weight loss by at least 70% when exposed to a sand slurry stream for 2 hours, as compared to an innermost layer produced from a high density polyethylene grafted with 0.9 weight % maleic anhydride;
the grafted polyolefin is produced from a parent polyolefin comprising ethylene and an α-olefin with 3 to 20 carbons; and
the parent polyolefin has a density of about 0.88 g/cc (ASTM D-792) or less.

18. The article of claim 17 wherein
the innermost layer has a reduction in weight loss by at least 80% when exposed to a sand slurry stream for 2 hours, as compared to an innermost layer produced from a high density polyethylene grafted with 0.9 weight % maleic anhydride;
the innermost layer has a thickness of about 6.3 to about 76 mm;
the parent polyolefin has a density of about 0.87 or lower; and
the α,β-ethylenically unsaturated carboxylic acid or anhydride is maleic anhydride.

19. The article of claim 18 further comprising, based on the total weight of the grafted polyolefin, from about 0.1 wt % to about 80 wt % of a filler.

* * * * *